United States Patent [19]

Smith

[11] Patent Number: 4,504,123
[45] Date of Patent: Mar. 12, 1985

[54] HIGH EFFICIENCY POLARIZING BEAMSPLITTER

[75] Inventor: Irl W. Smith, Newton, Mass.

[73] Assignee: Raytheon Company, Lexington, Mass.

[21] Appl. No.: 308,330

[22] Filed: Oct. 5, 1981

[51] Int. Cl.³ .............................................. G02B 27/10
[52] U.S. Cl. .................................. 350/394; 350/170; 350/173
[58] Field of Search ............... 350/169, 170, 172, 173, 350/1.1, 394, 395, 402

[56] References Cited

U.S. PATENT DOCUMENTS

| Re. 30,513 | 2/1981 | Bleukens et al. | 350/173 |
| 3,711,791 | 1/1973 | Erickson | 331/94.5 Q |
| 3,934,210 | 1/1976 | Yarborough et al. | 331/94.5 C |
| 3,982,203 | 9/1976 | de Wit | 331/94.5 Q |
| 3,983,507 | 9/1976 | Tang et al. | 331/94.5 M |
| 4,006,426 | 2/1977 | Lacour | 330/4.3 |
| 4,025,194 | 5/1977 | Teppo | 356/5 |

FOREIGN PATENT DOCUMENTS 1468051 3/1977 United Kingdom ................ 350/402

OTHER PUBLICATIONS

Jenkins et al., *Fundamentals of Optics*, p. 491, Third Ed., McGraw-Hill, 1957.

Primary Examiner—Bruce Y. Arnold
Attorney, Agent, or Firm—Richard M. Sharkansky; Joseph M. Pannone

[57] ABSTRACT

A high contrast Brewster angle polarizing beamsplitter in which splitting occurs on the internal surface of a dielectric material having a higher-refractive-index than the surrounding medium. The Brewster angle resulting from the incidence of electromagnetic radiation on the dielectric interface of the higher-refractive-index material to the lower-refractive-index medium is smaller than the one attained when using the external surface and thus results in a more compact beamsplitter configuration. A beamsplitter structure is also provided for obtaining one of the transmitted components that is collinear with the original beam.

12 Claims, 4 Drawing Figures

HIGH EFFICIENCY POLARIZING BEAMSPLITTER

BACKGROUND OF THE INVENTION

Beamsplitters available in the prior art use a large plate that is a fragile and expensive component since it is used near grazing incidence. The size of the beamsplitter is dictated by the large value of Brewster's angle resulting from the use of the external surface, the lower to higher dielectric constant interface, for splitting the linearly polarized components. This means that any auxiliary beam-splitting, as in heterodyned laser radar systems for example, must be mounted at some distance and the set of beam-splitters must be held in stable alignment. Another problem found in beamsplitters is the interference that can take place between multiple bounces inside the plate. This can lead to a variation in throughput by over a factor of two.

Additionally, a conventional beamsplitter used in a laser system does not prevent some of the reflected signals from leaking into the laser tube, thus perturbing the frequency of oscillation.

SUMMARY OF THE INVENTION

In accordance with this invention, there is provided means for propagating an electromagnetic wave through a first medium, and means for splitting said wave into two beams, said splitting means comprising a second medium adjacent said first medium, said first medium having a refractive index greater than that of said second medium. Preferably, said first and second media form an interface substantially at the Brewster angle with respect to the direction of the incident wave.

Further in accordance with this invention, there is provided a block of high-refractive-index material having a refractive index greater than that of air and having a first boundary surface for propagating to the inside of said block an incident electromagnetic beam having first and second components linearly polarized orthogonally to each other, and a second boundary surface disposed within said block transversely and at an angle to said beam for reflecting internally to said block a portion of substantially only said first component while transmitting to the outside of said block substantially all of said second component and the remainder of said first component. Additionally, there may be provided a third boundary surface intercepting said first reflected component and transmitting out of said block said first reflected component portion at a different angle than said second transmitted component. Preferably, said second and third boundary surfaces are positioned to transmit said first reflected component substantially collinearly with said incident beam.

Additionally, this invention provides for a polarizing beamsplitter comprising a block of material having a refractive index greater than that of air and having a first surface for transmitting into said block substantially all of a beam having s- and p-polarized components, said beam being incident on said surface at an angle within a predetermined range and a second surface positioned opposite said first surface intercepting said propagating beam at substantially the Brewster angle for reflecting said s-polarized component beam while transmitting said p-polarized component, and means for directing said s-polarized component out of said block in a direction collinear with the entry axis of said incident beam.

This invention also provides for a method of splitting an incident beam having p- and s-polarized components comprising the steps of transmitting said beam into a block of material having a refractive index higher than a surrounding medium, and providing an interface between said block and said medium intercepting said beam substantially at the Brewster angle. Preferably, said s-component is transmitted out of said block in a direction collinear with said incident beam.

The beamsplitter of this invention may also be advantageously used in a system comprising means for producing a first beam having first and second linearly polarized components, said components polarized orthogonal to each other, means for transmitting in a first direction said first component, said means comprising a block of material having a refractive index higher than an adjacent medium and having an internal surface intercepting said first beam at the Brewster angle as said first beam propagates through said block into said adjacent medium, and means for splitting off back-reflected portions of said transmitted first component, said means being positioned in the path of said reflected portions to further direct said reflected portions to a detector.

BRIEF DESCRIPTION OF THE DRAWINGS

These and other objects and advantages of the invention will be better understood from the following detailed description used in conjunction with the drawings in which like reference numbers refer to like parts or items and in which.

DESCRIPTION OF THE PREFERRED EMBODIMENT

Figure 1:
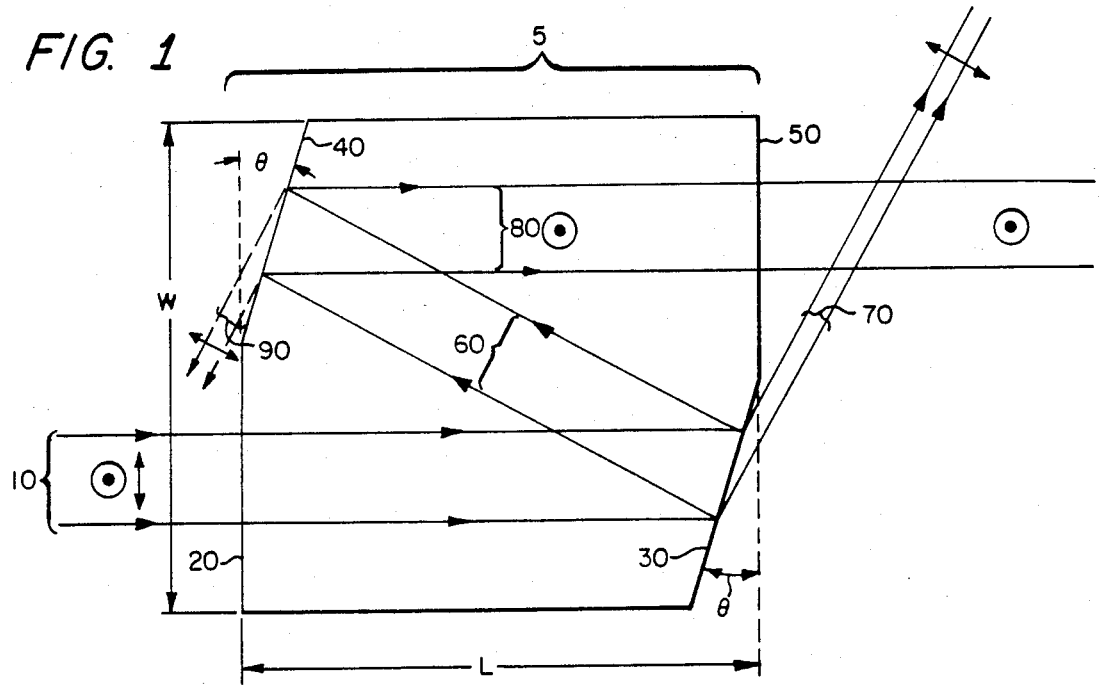
FIG. 1 illustrates a side view of the polarizing beamsplitter of the present invention with the ray paths showing the beamsplitting.

Referring now to FIG. 1, there is shown a polarizing beamsplitter 5 embodying the principles of the invention. Electromagnetic beam 10 is composed of two polarized components linearly polarized orthogonal to each other. The linearly polarized component parallel to the plane of incidence is referred to as the p-polarized component and is symbolized by a double-headed arrow, and the linearly polarized component perpendicular to the plane of incidence is referred to as the s-polarized component and is symbolized by a circle representing a similar arrow seen head-on. Beam 10 is incident on surface 20, which is coated with an anti-reflection layer, and is then transmitted through the beamsplitter body onto surface 30. It is at this inside surface that beamsplitting takes place.

For a beam incident on a boundary between two media of different dielectric constants, the reflectivity of the p-polarized component goes to zero at the Brewster angle $\theta_B$, defined as $\theta_B = \tan^{-1} n$ where n is the ratio of refractive indices of the two media ($n = n_2/n_1$ where $n_1$ and $n_2$ are the refractive indices of the first and second media respectively). Brewster angle $\theta_B$ is the angle of incidence of an electromagnetic beam on a dielectric interface, measured with respect to the normal to the dielectric interface. The usual system is to pass a beam incident at the Brewster angle $\theta_B$ through one or more slabs having parallel surfaces. At this angle, the reflectivity of the s-polarized component is given by $$R_s(\theta_B) = (n^2 - 1/n^2 + 1)^2$$

for one interface.

The resulting transmissions for the two polarized components are given by:

$$T_p(\theta_B, m) = 1$$

$$T_s(\theta_B, m) = (1 - R_s)^{2m} = (4n^2/[n^2+1]^2)^{2m}$$

where m is the number of slabs. Thus, for two slabs the leakage transmission of the s-polarized component is $T_s(\theta_B, 2) = 0.24$ percent A typical design of the prior art is two slabs tilted in opposite directions as in roof design. For a beam diameter d, this gives a beamsplitter at least 2d tan $\theta_B$ or 2nd long. For a beamsplitter made of optical quality germanium, the refractive index is 4 and $\theta_B = 75.96°$. The acceptance angle of such device due to geometrical aperturing alone is then at best a cone of half angle given approximately by $(\pi/2 - \theta_B)/4 = 3.5°$.

If a different design with the two plates parallel is used, then the half angle is about 10° for $T_p > 61$ percent, but there is significant sideways translation of the beam, which may complicate the process of alignment of the whole optical system.

The two plates must usually be separated at least by a distance d/2, measured normal to themselves, or nd/2 along the beam. This is necessary to prevent the multiple reflections between the plates from interfering with the main beam. To avoid multiple reflections within each plate, the thickness of the plate must be $n^2d/2$, which is prohibitive. In any case, the minimum length is 4d or more for germanium.

The beamsplitter 5 uses internal Brewster angle reflections at surfaces 30 and 40. By exploiting the interface between a medium having the higher refractive index and a medium having a lower refractive index a much smaller Brewster angle is obtained. Although this description uses the refractive index, it is understood that the dielectric constant could be used instead, since dielectric constant $\epsilon$ and refractive index n are related by $\epsilon = n^2$. Using germanium with n=4, it can be seen that a conventional beamsplitter using the external surface for splitting, and therefore a lower to higher refractive index boundary, results in $\theta_B = \tan^{-1} 4 = 75.9°$. With the present invention, using the internal surface, and therefore a higher to lower refractive index boundary, it results in $\theta_B = \tan^{-1} \frac{1}{4} = 14.0$. The smaller angle thus obtained allows for a beamsplitter design that has a very compact structure.

Incident beam 10 is made to be incident on surface 30 at the Brewster angle to the normal of surface 30. This is accomplished by inclining the normal to surface 30 at the Brewster angle with respect to the direction of travel of the beam within the beamsplitter. The reflected beam 60 contains only the s-polarized component and for germanium the reflectivity is $R_s = 77.9$ percent. The transmitted beam 70 contains the p-polarized component and also some (about 22.1%) of the original s-polarized component.

Reflected beam 60 is then incident on surface 40. Surface 40 is also oriented at the internal surface Brewster angle with respect to the angle of incidence of beam 60, so as to reflect most of the s-polarized component, as shown by beam 80. Beam 80 is then incident on surface 50 which is coated with an antireflection coating to allow transmission of the beam to the outside of the beamsplitter 5.

Beam 70 represents that portion of s-polarized beam 60 that gets transmitted at the dielectric boundary 30.

If this device is used in a system having beams traveling in both directions (e.g. as the transmit-receive duplexer in a laser radar) then beam 90 contains the p-polarized component of the return beam, plus some of the s-component, in a manner analogous to beam 70's containing the p-component of beam 10.

Beam 80 contains the transmission of s-polarized component after reflection on 2 surfaces and its intensity with respect to the original beam 10 is therefore given by the square of the reflectivity $R_s(\theta_B)$. Since $$R_s^2(\theta_B) = (n^2 - 1/n^2 + 1)^4$$

for germanium with n=4, beam 80 has 61 percent of the original s-polarized component of beam 10.

It is found that the six-sided prism of the present invention utilizing germanium as the high-refractive-index material, with n=4, functions in the infrared region of the spectrum as a polarizing beamsplitter with very high contrast. Contrast in this context is defined as the ratio of transmitted to rejected polarization. Such a device is useful in the infrared region since it easily replaces the wire grid type of polarizing beamsplitters, which is difficult to manufacture.

Figure 2:
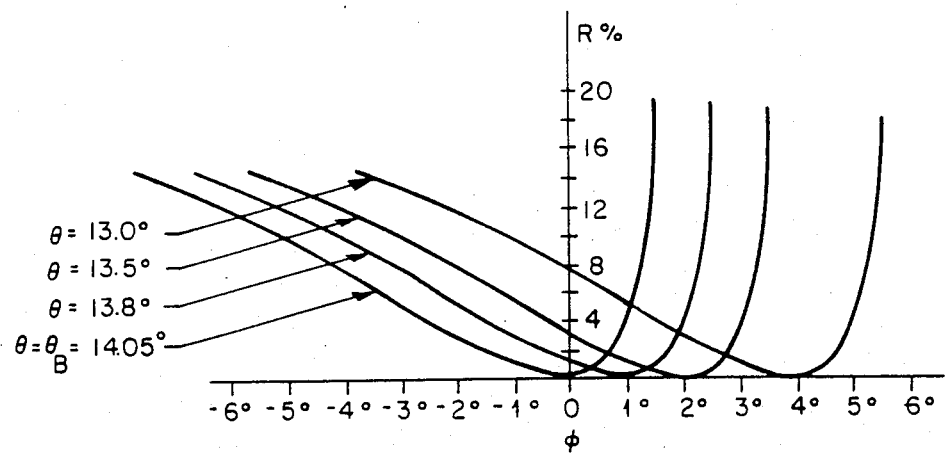
FIG. 2 is a plot of the reflectivity vs. angle of incidence for various angles of the beamsplitting surface of a beamsplitter made of germanium.

The reflectivity of the p-polarized component of surfaces 30 and 40 as a function of the angle of incidence $\phi$ on the entrance surface 20 is plotted in FIG. 2 for different surface angles $\theta$ of a block made of germanium. The leakage of the p-polarized component for reflection on two surfaces is equal to the square of the reflectivity for one surface. Since the reflectivity curve is not symmetric about $\phi = 0$, the normal incidence case, it may be desirable to make the angle $\theta$ of surfaces 30 and 40 slightly different from $\theta_B$, the value of the Brewster angle for internal reflection. For instance, if the need is for a range of incidence angles $\phi$ from $-2°$ to $2°$, then by setting angle $\theta = 13.8°$, instead of $\theta = 14.05$, the needed range can be achieved at the cost of a p-polarized component leakage ("feed-through") of 0.25 percent or less over the $\pm 2°$ range.

Figure 3:
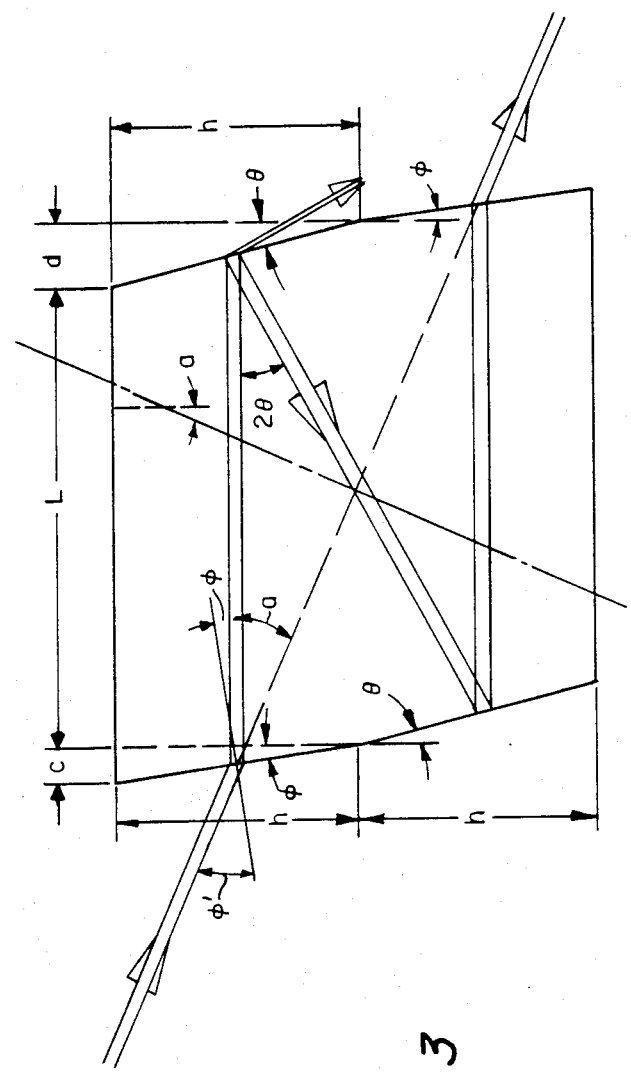
FIG. 3 illustrates a beamsplitter for which the optical path of transmitted beam is collinear with the optical path of the incident beam.

Referring now to FIG. 3, there is shown a different embodiment of the polarizing beamsplitter of the present invention. This particular embodiment is useful especially for laboratory applications since it results in a transmitted s-polarized component that is collinear with the incident entry beam.

To allow for an adequate acceptance angle, the surface angle $\theta$ is not made equal to the Brewster angle $\theta_B = \tan^{-1} 1/n = 14.05°$. Instead a small deviation from it is preferred, as explained above in reference to FIG. 2, and the angle selected is $\theta = 13.90°$. Referring again to FIG. 3, there are found the following relationships:

acceptance aperture = h cos a $d = h \tan \theta$ $L = (h/ \tan 2\theta)$ $\tan a = (h/L + d + c)$ $c = h \tan \phi$ $$\phi' - \phi = a$$

$$\sin \phi' = n \sin \phi$$

Selecting h=1 cm and using $\theta=13.90°$ and n=4, the equations can be solved to obtain values for the design parameters for the polarizing beamsplitter of FIG. 4b. This results in the following specification: $\phi=7.57°$, $\phi'=31.83°$, a=24.27°, L=1.90 cm, d=0.25 cm, c=0.13 cm.

The polarizing beamsplitter described can also be used as a polarization analyzer simply by using it in the path of a linearly polarized beam and measuring the relative amount of energy in the two orthogonal components.

Figure 4:
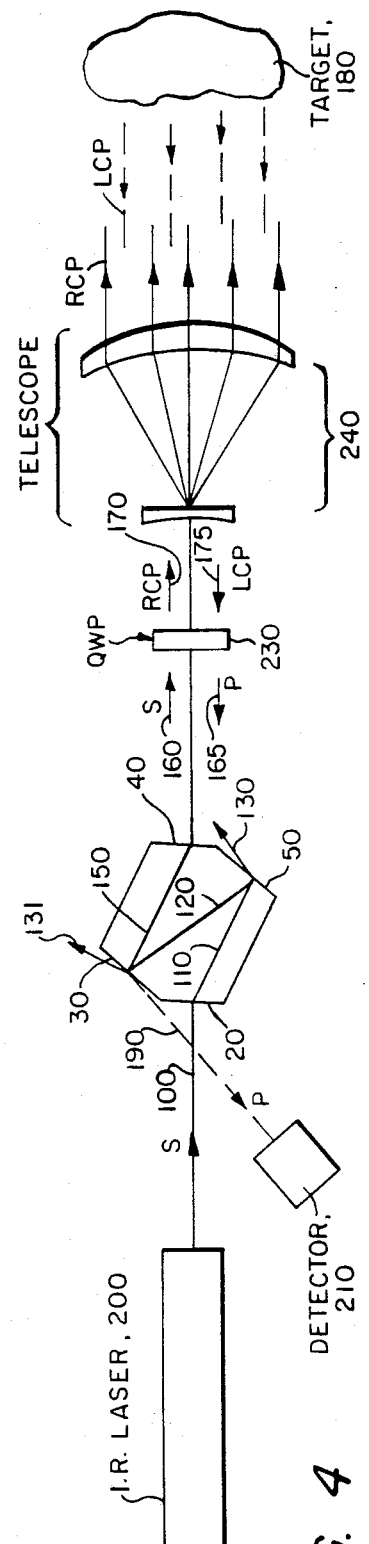
FIG. 4 illustrates the beamsplitter of the present invention in a laser radar system.

Referring now to FIG. 4, there is shown a laser radar system employing the polarizing beamsplitter of the present invention. Laser 200 transmits a beam 100 which can be made s-polarized by the use of conventional means. Beam 100 is incident on surface 200, which is antireflection-coated to transmit beam 110 through the beamsplitter body. Beam 110 is then incident on surface 50 at the Brewster angle, defined by the dielectric interface between the media, where a small amount of the s-polarized component is transmitted outside the beamsplitter as shown by beam 130. The reflected s-polarized component 120 is then incident at the brewster angle on surface 30 from where it is reflected, as shown by beam 150, on to surface 40 which is coated with antireflection material. Again, a small amount of s-polarized component is transmitted outside the beamsplitter as beam 131. S-polarized beam 160 is then directed on to quarterwave plate 230 to change the polarization of transmitting beam 160 from linear to right circular. The right circularly polarized beam 170 is transmitted through a beam expanding telescope 240 to a target 180. A beam of right circularly polarized light normally incident on a non-depolarizing media is reflected as left circularly polarized light; even for off-normal incidence and depolarizing scattering cases, the right-to-left scattering is usually much stronger than the right-to-right scattering. Thus, left circularly polarized return beam 175 is collected with telescope 240 and sent through quarter wave plate 230 to change itsl polarization back to linear. However, the linear polarization of received beam 175 is orthogonal to that of transmitting beam 170, thus beam 165 is now p-polarized. As the received beam is transmitted through the body of the beamsplitter, as shown by beam 150, it is incident at the surface 30 which is placed at the Brewster angle in relation to beam 150. Since beam 150 is now p-polarized it is entirely transmitted out of the beamsplitter and onto detector 210, as shown by beam 190. To operate a heterodyne system, a conventional low-reflectance beamsplitter placed, for example, at the intersection of beams 100 and 190, is used to derive a local oscillator signal, and an additional half wave plate is positioned in the path of beam 190 to rotate its polarization, so that proper mixing of the received and local oscillator signal can take place.

Other modifications to the described embodiments will be apparent to persons skilled in the art without departing from the spirit and scope of this invention. Accordingly, it is intended that this invention be not limited except as defined by the appended claims.

What is claimed is:

1. In combination:
   means for propagating an incident electromagnetic wave through a first medium, such wave being incident on, and substantially normal to, a first surface of the first medium;
   means for splitting said propagating wave into two beams, said splitting means comprising a second medium adjacent the first medium at an interface, the first medium having a refractive index greater than that of the second medium, said refractive index of the first medium being substantially the same with respect to each of the two beams,
   wherein said interface is substantially at the Brewster angle with respect to the direction of the propagating wave incident on such interface.

2. In combination:
   means for producing an electromagnetic beam having first and second components linearly polarized orthogonally to each other along a predetermined path; and
   a block of high-refractive-index material immediately surrounded by a first medium and positioned stationary to said predetermined path, said block having a refractive index greater than that of the first medium and having a first boundary surface positioned to intercept said predetermined path of the produced electromagnetic beam at an angle different from the Brewster angle and to propagate such electromagnetic beam to the inside of said block, the first and second components of the beam propagating at substantially the same speed inside of said block,
   said block having a second boundary surface disposed transversely and at an angle to said beam, wherein said secondary boundary surface reflects internally to said block a portion of substantially only said first component and transmits to the outside of said block substantially all of said second component and the remainder of said first component.

3. The combination of claim 2 further comprising:
   a third boundary surface positioned to intercept and reflect said reflected first component; and
   a fourth boundary surface aligned to intercept the third-surface-reflected first component and to transmit out of said block said third-surface-reflected first component.

4. The combination of claim 3 wherein:
   said second, third and fourth boundary surfaces are positioned to transmit out of said block said third-surface-reflected first component substantially collinearly with said predetermined path of the produced electromagnetic beam.

5. In combination:
   means for producing a beam of energy along a predetermined path, said beam of energy having s- and p-components; and
   a beam splitter positioned stationary to said predetermined path, said beam splitter comprising a block of nonbirefrigent, high-refractive-index material having a first surface positioned to intercept said predetermined path of the produced beam at an angle different from the Brewster angle and to transmit such beam into said block, and a second surface positioned to intercept the beam transmitted into the block at substantially the Brewster angle;
   wherein said second surface substantially reflects internally to said block said s-component of said beam and transmits to the outside of said block in a first direction said p-component.

6. The combination of claim 1 wherein:
said block further has a third surface positioned to intercept and reflect said s-component, and a fourth surface disposed to transmit said s-component to the outside of said block in a second direction.

7. The combination of claim 6 wherein:
said third-surface-reflected s-component emerges from said block in a direction collinear with said incident beam.

8. The combination of claim 7 wherein:
said third surface intercepts said s-component at substantially the Brewster angle.

9. In combination:
means for producing a beam of energy along a predetermined path, said beam having s- and p-polarized components;
a block of material immediately surrounded by a first medium and positioned stationary to said predetermined path, said block having a refractive index greater than that of the first medium and having a first surface positioned to intercept said predetermined path of the produced beam at an angle different from the Brewster angle and to transmit into said block substantially all of the beam, and a second surface positioned opposite said first surface to intercept said beam at substantially the Brewster angle for reflecting said s-polarized component while transmitting said p-polarized component; and
means for directing said s-polarized component out of said block in a direction collinear with the predetermined path of said produced beam.

10. A method of splitting a beam having p- and s-polarized components comprising the steps of:
producing a beam having p- and s-polarized components;
transmitting said produced beam along a predetermined path into a block of material having a first surface which intercepts said predetermined path at an angle different from the Brewster angle, the block having a refractive index higher than a surrounding medium;
propagating the p- and s-polarized coponents through the block at substantially the same speed; and
intercepting said beam substantially at the Brewster angle at an interface between a second surface of the block and the surrounding medium.

11. The method of claim 10 further comprising the steps of:
transmitting said s-component out of said block in a direction collinear with said incident beam.

12. A system for transmitting a beam towards a target, receiving portions of such beam reflected by the target and directing said received beam portions to a detector, such system comprising:
first means for producing a first beam along a predetermined path, said beam having first and second linearly polarized components, said components polarized orthogonal to each other; and
second means for transmitting in a first direction a beam polarized as said first component for reflection by the target, said second means comprising a block of material having a refractive index higher than an adjacent medium and having a first surface intercepting said predetermined path of the first beam at a fixed angle different from the Brewster angle as said beam passes into the block, and having a second surface intercepting the first beam at the Brewster angle as said beam propagates through said block into said adjacent medium;
wherein said second means receives portions of said transmitted beam reflected by the target and includes a third surface positioned in the path of said reflected portions to further direct said reflected portions to the detector.

* * * * *

UNITED STATES PATENT AND TRADEMARK OFFICE
CERTIFICATE OF CORRECTION

PATENT NO. : 4,504,123

DATED : March 12, 1985

INVENTOR(S) : Irl W. Smith

It is certified that error appears in the above-identified patent and that said Letters Patent is hereby corrected as shown below:

Column 3, line 19, after "in" insert -- a --.

Column 5, line 20, "200" should read -- 20 --.

Column 6, line 32, "secondary" should read -- second --.

Signed and Sealed this

Twelfth Day of November 1985

[SEAL]

Attest:

DONALD J. QUIGG

Attesting Officer

Commissioner of Patents and Trademarks